United States Patent
Goulart et al.

(10) Patent No.: US 10,319,012 B2
(45) Date of Patent: Jun. 11, 2019

(54) VIEW ITEMS BASED ON PURCHASES OF SOCIAL MEDIA CONTACTS

(71) Applicant: Wal-Mart Stores, Inc., Bentonville, AR (US)

(72) Inventors: Valerie Goulart, Seattle, WA (US); Lauren Jill Patti, San Francisco, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 1199 days.

(21) Appl. No.: 13/929,124

(22) Filed: Jun. 27, 2013

(65) Prior Publication Data
US 2015/0006324 A1    Jan. 1, 2015

(51) Int. Cl.
*G06Q 30/06* (2012.01)
*G06Q 50/00* (2012.01)

(52) U.S. Cl.
CPC ......... *G06Q 30/0613* (2013.01); *G06Q 50/01* (2013.01)

(58) Field of Classification Search
CPC .... G06Q 30/02; G06Q 30/0631; G06Q 50/01; G06Q 30/0613
USPC ..................................................... 705/26.41
See application file for complete search history.

(56) References Cited

U.S. PATENT DOCUMENTS

| | | | |
|---|---|---|---|
| 7,720,722 B2 | 5/2010 | Ho | |
| 7,725,362 B2 | 5/2010 | Weathers, Jr. | |
| 7,945,482 B2 | 5/2011 | Law | |
| 8,504,486 B1* | 8/2013 | Pinto | G06Q 30/0631 705/1.1 |
| 8,560,397 B2 | 10/2013 | Chong | |
| 2006/0085259 A1 | 4/2006 | Nicholas | |
| 2007/0168216 A1* | 7/2007 | Lemelson | G06Q 30/00 705/26.1 |
| 2007/0239552 A1 | 10/2007 | Sundaresan | |
| 2008/0154915 A1 | 6/2008 | Flake | |
| 2009/0177695 A1* | 7/2009 | Mahajan | G06Q 10/10 |
| 2009/0182637 A1 | 7/2009 | Roberts | |
| 2011/0093361 A1 | 4/2011 | Morales | |
| 2012/0059848 A1 | 3/2012 | Krishnamoorthy | |
| 2012/0150598 A1 | 6/2012 | Griggs | |
| 2013/0073473 A1 | 3/2013 | Heath | |

(Continued)

FOREIGN PATENT DOCUMENTS

WO    WO2013116708 A1    8/2013

*Primary Examiner* — Joy Chng
(74) *Attorney, Agent, or Firm* — Bryan Cave Leighton Paisner LLP

(57) ABSTRACT

A computer-implemented method for providing shopping information for a plurality of contacts of a social network of a user to a computing device corresponding to the user includes receiving a request from the computing device to provide shopping information for one or more contacts of the social network. The shopping information relates to one or more items offered for sale by a retailer indicative of a shopping action performed and explicitly shared by the one or more contacts. The shopping information is obtained based on the request and shopping display data is generated based on the obtained shopping information. The shopping display data is prompted to the computing device. The shopping display data prompts the computing device to display the shopping information in a graphical user interface of the computing device.

22 Claims, 7 Drawing Sheets

(56) References Cited

U.S. PATENT DOCUMENTS

| | | |
|---|---|---|
| 2013/0110666 A1 | 5/2013 | Aubrey |
| 2014/0040029 A1 | 2/2014 | Vhora |
| 2014/0081750 A1 | 3/2014 | Hosp |
| 2014/0081844 A1 | 3/2014 | Hosp |
| 2014/0082744 A1 | 3/2014 | Behforooz |

* cited by examiner

US 10,319,012 B2

VIEW ITEMS BASED ON PURCHASES OF SOCIAL MEDIA CONTACTS

BACKGROUND INFORMATION

Field of the Disclosure

The present invention relates generally to methods for providing shopping information for a plurality of contacts of a social network of a user to a computing device corresponding to the user. In particular, examples of the present invention are related to techniques for providing shopping information to a computing device of a user that relates to one or more items offered for sale by a retailer indicative of a shopping action performed by one or more contacts of a social network of the user.

Background

Modern technology offers today's consumers a wide range of tools for interacting in the marketplace. Using computing devices, e.g., smart phones, tablets and stationary computing devices, consumers have access to a wide range of information and a broad array of shopping tools for purchasing anything from electronic devices to simple groceries from retailers. The consumer may select various items for purchase from the retailer using the computing device.

It is known, for many consumers to be members of social networks, e.g., Pinterest® and Twitter®, that allow the consumers to connect with contacts, e.g., "Friends", and share various types of information. The user is required to log on to a server maintained by the social network to view information published by the contacts and to interact therewith. One drawback is that a consumer who prefers to electronically shop at a specific retailer, e.g., through a mobile application or website furnished by the retailer, has no indication of what items offered for sale by the retailer their contacts of the social network are interested in or may have purchased. In this scenario, the consumer would have to log into the social network and cypher through various publications, e.g., "posts", shared by their contacts to learn what items are of interest or have been purchased. In addition, the contacts of the social network may not go out of their way to explicitly share, via the social network, the items they are interested in or have purchased.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
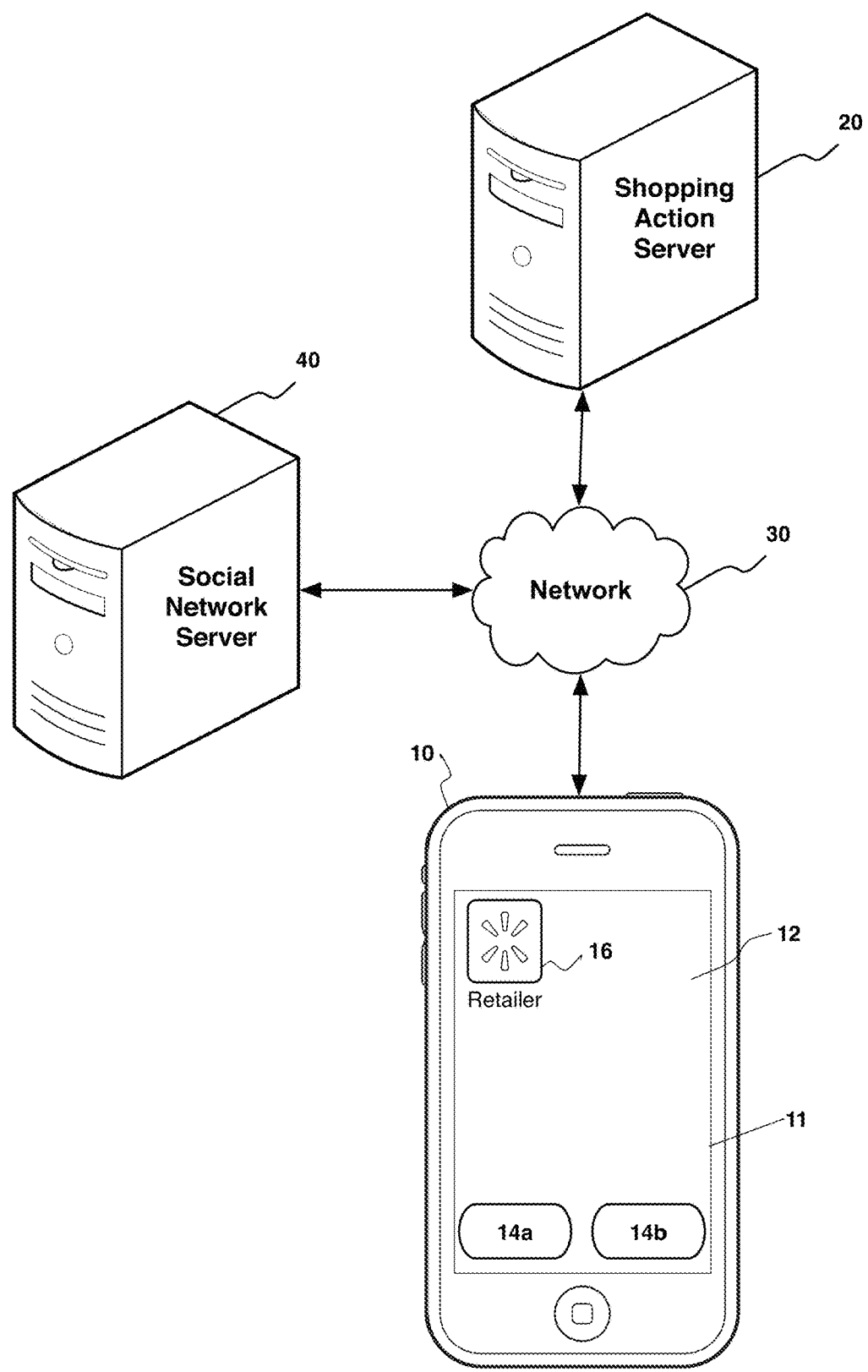
FIG. 1 schematically illustrates a shopping action server in communication with a social network server and a computing device displaying a graphical user interface, in accordance with the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. Techniques for providing shopping information for one or more contacts of a social network of a user for display in a graphical user interface of a computing device corresponding to the user are described herein. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system."Furthermore, the present invention may take the form of a computer program product embodied in any tangible medium of expression having computer-usable program code embodied in the medium.

It may be desirable to allow users to use the capabilities of their computing devices to view items offered for sale by a retailer that contacts of a social network of the user are interested in, or may have purchased. As used herein, the term "contact" can refer to friends, acquaintances, or other human beings of a social network that user has selected to share information with and receive information from. Displaying shopping information for one or more contacts of a social network, are described herein. The term "user" can refer to a potential consumer, customer or shopper at the retailer.

Some users use the capabilities of their computing devices to obtain and view information. For example, a user may request a shopping action server to obtain shopping information for one or more contacts of a social network by selecting a graphical element related to the request that is displayed in a graphical user interface (GUI) of a computing device. As used herein, the term "computing device" can refer to mobile computing devices, such as mobile telephones, laptop computers, and tablet computers, or stationary computing devices. The shopping action server may generate shopping display data based on the obtained shopping information and transmit the shopping display data to the computing device. Thereafter, the transmitted shopping display data can prompt to the computing device to display the shopping information for display in the GUI for the user to view. Specifically, the shopping information relates to one or more items offered for sale by the retailer indicative of a shopping action performed and explicitly shared by the one or more contacts. As used herein, the term "item" can refer to any type of indicator of a product sold by a retailer; and the term "product" can refer to groceries, foods, office supplies, clothing wares, or any other fungible goods sold by the retailer. The user may perform one or more operations via displayed graphical elements and/or operational inputs based on the displayed shopping information for the one or more contacts of the social network.

In accordance with various embodiments of the present disclosure, techniques are described for allowing a user to view items offered for sale by the retailer that one or more contacts of the social network are interested in or have purchased. For instance, the user may select a graphical element displayed in the GUI to filter out or only include specific items indicated by the user via an item search or by department. In response to the selection, the shopping action server receives "item inclusion information" including a preference by the user for only providing shopping information relating to items that are explicitly preferred by the user. The item inclusion information may be stored as user profile information in a user database until the user changes the item inclusion information. Additionally or alternatively, the user may select a graphical element displayed in the GUI to filter out or only include shopping information pertaining to specific contacts indicated by the user. In response to the selection, the shopping action server receives "contact inclusion information" including a preference of the user for only providing shopping information for contacts that are explicitly preferred by the user. The contact inclusion information may be stored as user profile information in the user database until the user changes the contact inclusion information.

Furthermore, techniques are described for allowing a user to request the shopping action server to provide a list of items to the computing device. For instance, the user may browse items offered for sale by the retailer that are trending on the social network, the items indicating a shopping action performed by one or more contacts of the social network. The shopping action can include any one of a purchase, a published comment, a published review, and a rating performed by the one or more contacts and relating to the one or more items. Similarly, the user may browse an electronic catalog listing one or more items offered for sale and additionally browse the items trending on the social network interspersed within the electronic catalog, wherein the electronic catalog is furnished by the retailer for display in the GUI of the mobile computing device. By selecting a graphical element, e.g., "Social Network Trending Items" button, displayed in the GUI, the user can request to view the list of items each indicative of the shopping action performed by the one or more contacts of the social network. In another embodiment, the user may browse a plurality of contacts of the social network displayed in the GUI having performed a shopping action relating to one or more items. One or more additional graphical elements may be displayed in the GUI that allow the user to change item inclusion information and/or contact inclusion information to update the list of items or the list of contacts.

Furthermore, techniques are described for obtaining each item of the list of items requested by the computing device. For instance, a social network server may provide contact identifiers for storage in a social network database. Each contact identifier corresponds to respective ones of contacts of the social network of the user. In one embodiment, a social network may update the contact identifiers stored in the social network database when the user adds new contacts or removes existing contacts. The shopping action server may query the social network database to receive one or more contact identifiers. In one embodiment, only contact identifiers corresponding to contacts indicated in the contact inclusion information are received. Thereafter, the shopping action server may retrieve each item having the shopping action performed by at least one of the contacts from an item database using the one or more contact identifiers. The list of items requested by the user is then generated based on each item retrieved from the item database. Shopping display data based on the obtained list of items, i.e., shopping information, may be generated and transmitted to the computing device such that the list of items is displayed in the GUI of the computing device. In one embodiment, the user may select one of the items of the list to view one or more contacts having performed the shopping action relating to the selected item. In another embodiment, the user may select one of the items pertaining to a shopping action performed by one of the contacts previously selected, wherein the shopping action performed by the previously selected contact can be viewed upon selection of the item.

Techniques are further described for allowing a user to request the shopping action server to provide a list of contacts to the computing device. For instance, the user may browse the list of items prompted for display by the shopping display data, as discussed above, and select one of the items the user is interested in to view a list of one or more contacts having performed a shopping action related to the selected item. Thus, by selecting a graphical element displayed in the GUI in relation to one of the listed items, the user can request to view the list of contacts each having performed the shopping action relating to the item selected by the computing device. In one embodiment, the list of contacts only includes contacts as indicated in the contact inclusion information.

Furthermore, techniques are described for obtaining each contact of the list of contacts having performed the shopping action related to the selected item as requested by the computing device. For instance, an item identifier, e.g., UPC, may be obtained upon selection of the item. The item identifier may be received by the shopping action server from the computing device. Thereafter, the shopping action server may retrieve each contact having performed the shopping action related to the selected item from a shopping action database using the item identifier. The shopping action database is updated by the shopping action server and is configured to store a plurality of contacts having performed the shopping action related to a plurality of items. Accordingly, a social network server may update the contacts stored in the shopping action database every time a contact performs a shopping action and explicitly shares the shopping action. The list of contacts requested by the user is then generated based on each contact retrieved from the shopping action database. Shopping display data based on the obtained list of contacts, i.e., shopping information, may be generated and transmitted to the computing device such that the computing device prompts the list of contacts for display in the GUI. In one embodiment, the user may select one of the contacts to view the shopping action related to the selected item. For instance, the user may view a review published by the contact relating to the selected item that includes a rating of the selected item. In other embodiments, one or more operational inputs may be displayed in the GUI in response to the user selecting the contact having performed the shopping action relating to the selected item that allows the user to interact with the contact. For instance, the user may inquire the contact about how a jacket the contact purchased fits, wherein the contact can respond to the inquiry.

FIG. 1 illustrates a computing device 10 in communication with a shopping action (SA) server 20 and a social network server 40 via network 30. While one SA server 20 is illustrated, the term "shopping action server" refers to one or more servers that operate in an individual or distributed manner. As used herein, the term "network" can refer to any communication network including, but not limited to, a wireless network, a cellular network, an intranet, the Internet, or combinations thereof. In the illustrated example, the computing device 10 is a mobile computing device displaying a graphical user interface (GUI) 12 on a touch screen 11 of the computing device 10. While a touch screen 11 is illustrated, it should be appreciated that other user interfaces can be used to allow a user to interact with the computing device 10. While a mobile computing device is illustrated, it should be appreciated that a stationary computing device could be equivalently used to carry out the present techniques. As used herein the term "social network server" refers to one or more servers that operate in an individual or distributed manner and can correspond to one or more different social networks.

In an exemplary embodiment, the social network server 40 communicates information with the SA server 20 and the computing device 10. For instance, the social network server 40 can update contact identifiers stored in a social network database of the SA server 40 as the computing device 10 adds or removes contacts associated with the user. Likewise, the social network server 40 can update contacts stored in a shopping action database of the SA server 40 as contacts of the social network perform shopping actions relating to items offered for sale by the retailer.

The GUI 12 allows a user to interact with the computing device 10. The GUI 12 may display at least one operational input, e.g., push buttons 14a and 14b, that allows the user to provide a command to the SA server 20, the command causing the SA server 20 to perform one or more operations. The GUI 12 may additionally display at least one graphical element, shown here as icon 16, that may be selected via the touch screen 11. Graphical elements, such as icon 16, may represent various layers, windows, screens, templates, elements, or other components that may be displayed in some or all areas of the GUI 12 upon selection by the user. Furthermore, selection of a graphical element may lead to a hierarchical navigation process, such that selection of a graphical element (e.g., icon 16) leads to a screen/display that includes one or more additional graphical elements. A textual indicator, e.g., "Retailer", may be displayed on or near the icon 16 to facilitate user interpretation of each graphical element. It should be appreciated that the GUI 12 may include various components arranged in hierarchical and/or non-hierarchical structures.

When a graphical element, e.g., icon 16, is selected, the device 10 may be configured to open an application associated with that element and display a corresponding screen. For example, when icon 16 is selected, the device may open a shopping program and display a shopping menu, e.g., Social Network Shopping Display, displaying various tools and features available in the shopping program for viewing shopping information of contacts of the social network. For each application, screens may be displayed on the GUI 12 that include various user interface elements.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The SA server 20 may include a processing device that receives a request from the computing device 10 to provide shopping information for one or more contacts of the social network of the user. When the user selects a graphical element displayed in the GUI 12, the processing device can obtain shopping information based on the request. Specifically, the shopping information relates to one or more items offered for sale by the retailer indicative of a shopping action performed and explicitly shared by one or more of the contacts. In one embodiment, the user can select a graphical element displayed in the GUI 12 to request a list of items each indicating a shopping action performed by one or more of the social contacts. In another embodiment, the user can select a graphical element corresponding to an item displayed in the GUI 12 to request a list of contacts each having performed a shopping action related to the item selected by a user. Exemplary embodiments include the shopping action including at least one of a purchase, a published comment, a published review and a rating relating to one or more of the items offered for sale by the retailer. When the computing device 10 makes the request to provide the shopping information, the processing device can obtain the shopping information, generate shopping display data based on the obtained shopping information, and transmit the shopping display data to the computing device 10. When the shopping display data is received, the computing device is prompted to display the shopping information for the one or more users of the social network. Once the shopping information is displayed, the user may undertake a navigational process through selection of one or more graphical elements and/or operational inputs to view a displayed shopping action relating to a selected item performed by a selected item. The GUI 12 can be further prompted to display one or more operational inputs relating to the displayed shopping action that allows the user to interact with the selected contact with respect to the selected item.

Any combination of one or more computer-usable or computer-readable media may be utilized by the processing device of the SA server 20. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Figure 2:
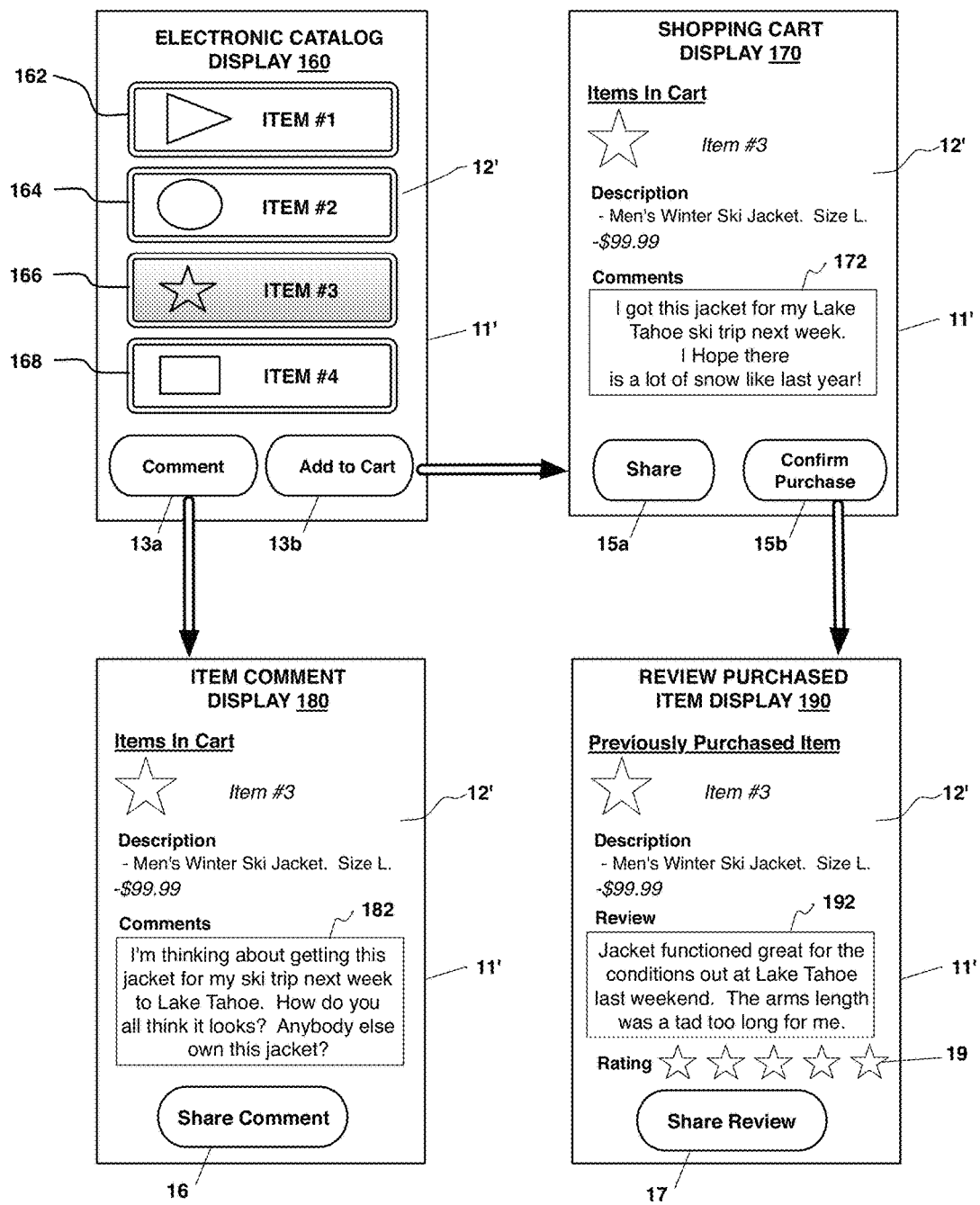
FIG. 2 schematically illustrates a non-limiting example of various scenarios of a contact of a social network performing a shopping action related to an item offered for sale by a retailer, in accordance with the present disclosure.

FIG. 2 schematically illustrates a non-limiting example of various scenarios of a contact of a social network performing a shopping action related to an item offered for sale by a retailer. For instance, the contact may correspond to one of the contacts of the user. FIG. 2 includes a GUI 12' displayed upon a touch screen 11' of a computing device corresponding to the contact for displaying a screen for an electronic catalog display 160, a screen for a shopping cart display 170, a screen for an item comment display 180, and a screen for a review purchased item display 190.

The electronic catalog display 160 includes graphical elements 162, 164, 166 and 168, e.g., buttons, which allow the contact to access the feature for selecting items as indicated. As illustrated, graphical elements, e.g., buttons, 162, 164, 166 and 168 each correspond to respective items #1, #2, #3 and #4. If the contact is interested in one of the items, the contact may select the respective button to select the item. In one embodiment, the contact touches or taps the respective button displayed upon the GUI 12'. For instance, the selected button may be emphasized to indicate that the contact has selected the respective item. The contact may search for desired items in the electronic catalog display 160 and scroll through items organized by category or retailer department. Accordingly, the computing device receives a contact input, e.g., tapping or touching, to select the item from the electronic catalog display 160 in the GUI 12'. In the illustrated embodiment, the contact has selected graphical element 166 indicating "Item 3". The electronic catalog display 160 further includes operational inputs, 13a and 13b, e.g., buttons. The operational inputs may include textual indicators to facilitate contact interpretation that an action input by the contact to the operational input 13a will "Comment" and an action input by the contact to the operational input 13b will "Add to Cart". Upon selection of the "Comment" button 13a, the contact may be advanced to the item comment display 180 to allow the contact to publish a comment and or publish a rating related to the selected item, e.g., "Item 3". Upon selection of the "Add to Cart" button 13b, the contact may be advanced to the shopping cart display 170 to allow the contact to purchase the selected item, e.g., "Item 3".

The shopping cart display 170 provides an electronic shopping cart corresponding to the user. As used herein, the term "electronic shopping cart" can refer to a list of one or more items selected by a user indicating products that the user intends to purchase. The shopping cart display 170 displays description information related to the item, e.g., "Item 3", selected from the electronic catalog display 160. The description information can include a graphic of the selected item, a description of the selected item, e.g., "Men's Winter Ski Jacket, size L", and a cost to purchase the selected item from the retailer. The shopping cart display 170 further displays a textual input element 172 and operational inputs, e.g., buttons 15a and 15b. The textual input element 172, when selected by the contact, allows the contact to insert text to publish a comment describing the selected item the contact is about to purchase. For instance, the contact may provide a rational for purchasing the selected item to share with one or more contacts of the social network. In one embodiment, a keyboard me be prompted by the computing device for display upon the GUI 12' so that the contact can insert the text. The operational inputs may include textual indicators to facilitate contact interpretation that an action input by the contact to the operational input 15a will "Share" a comment published by the contact in the textual input element 172 with one or more contacts of the social network and an action input by the contact to the operational input 15b will "Confirm Purchase" of the selected item. Accordingly, the shopping cart display 170 illustrates a non-limiting example of a scenario of the contact of the social network performing and explicitly sharing a shopping action, e.g., published comment and a purchase, related to a selected item upon selecting the "Share" button 15a and the "Confirm Purchase" button 15b. Upon selection of the "Confirm Purchase" button 15a, the contact may be permitted to access the review purchased item display 190 to allow the contact to publish a review related to the now purchased item, e.g., "Item 3".

The review purchased item display 190 allows the contact to publish a review related to the purchased item, via selection of the "Confirm Purchase" button 15b in the shopping cart display 170. The published review can include any one of a published comment and a rating of the purchased item. In one embodiment, the contact may only be permitted to access the review purchased item display 190 after a predetermined period of time has elapsed that is sufficient for the contact to try out and use the product indicated by the purchased item. The review purchased item display 190 displays description information related to the purchased item including a graphic of the selected item, a description of the selected item, and a cost incurred by the contact to purchase the selected item from the retailer. The review purchased item display 190 further displays a textual input element 192, one or more rating elements 19 and an operational input, e.g., button 17. Selection of the textual input element 192 allows the contact to insert text to publish a review describing the purchased item. For instance, the contact may indicate what the contact has used the item for and how satisfied the contact is with the purchase. In one embodiment, a keyboard may be prompted by the computing device for display upon the GUI 12' so that the contact can insert the text. The one or more rating elements 19 allow the contact to provide a rating of the purchased item. In one embodiment, the contact touches or taps the number of rating elements 19 displayed upon the GUI 12'. The operational input 17 may include a textual indicator to facilitate contact interpretation that an action input by the contact to the operational input 17 will "Share Review" related to the review published in the textual input element 192 and the rating indicated by the selected number of rating elements 19 with one or more contacts of the social network. Thereafter, the one or more contacts may interact with the contact regarding the shared review and rating published by the contact. Accordingly, the review purchased item display 190 illustrates a non-limiting example of a scenario of the contact of the social network performing and explicitly sharing a shopping action, e.g., published review and rating, related to a purchased item.

The item comment display 180 allows the contact to publish a comment related to the item selected, e.g., "Item 3", that the contact is currently interested in, but is not necessarily going to purchase. The item comment display 180 displays description information related to the selected item including a graphic of the selected item, a description of the selected item, and a cost to purchase the selected item from the retailer. The item comment display 180 further displays a textual input element 182 and an operational input, e.g., button 16. Selection of the textual input element 182 by the contact allows the contact to insert text to publish a comment related to the selected item the contact is interested. For instance, the contact may indicate a desire to purchase the selected item and further request one or more contacts of the social network to voice their opinions regarding the contacts desire. In one embodiment, a keyboard me be prompted by the computing device for display upon the GUI 12' so that the contact can insert the text. Additionally, or in alternative to the textual input element 182, a graphical element can be displayed that indicates that the contact is simply interested in or intrigued by the selected item. The operational input 16 may include a textual indicator to facilitate contact interpretation that an action input by the contact to the operational input 16 will "Share Comment" related to the comment published by the contact in the textual input element 182 with one or more contacts of the social network. Thereafter, the one or more contacts of the social network may respond to the comment published the contact. Accordingly, the item comment display 180 illustrates a non-limiting example of a scenario of the contact performing and explicitly sharing a shopping action, e.g., published comment, related to a selected item the contact is interested in or intrigued by.

Figure 3A:
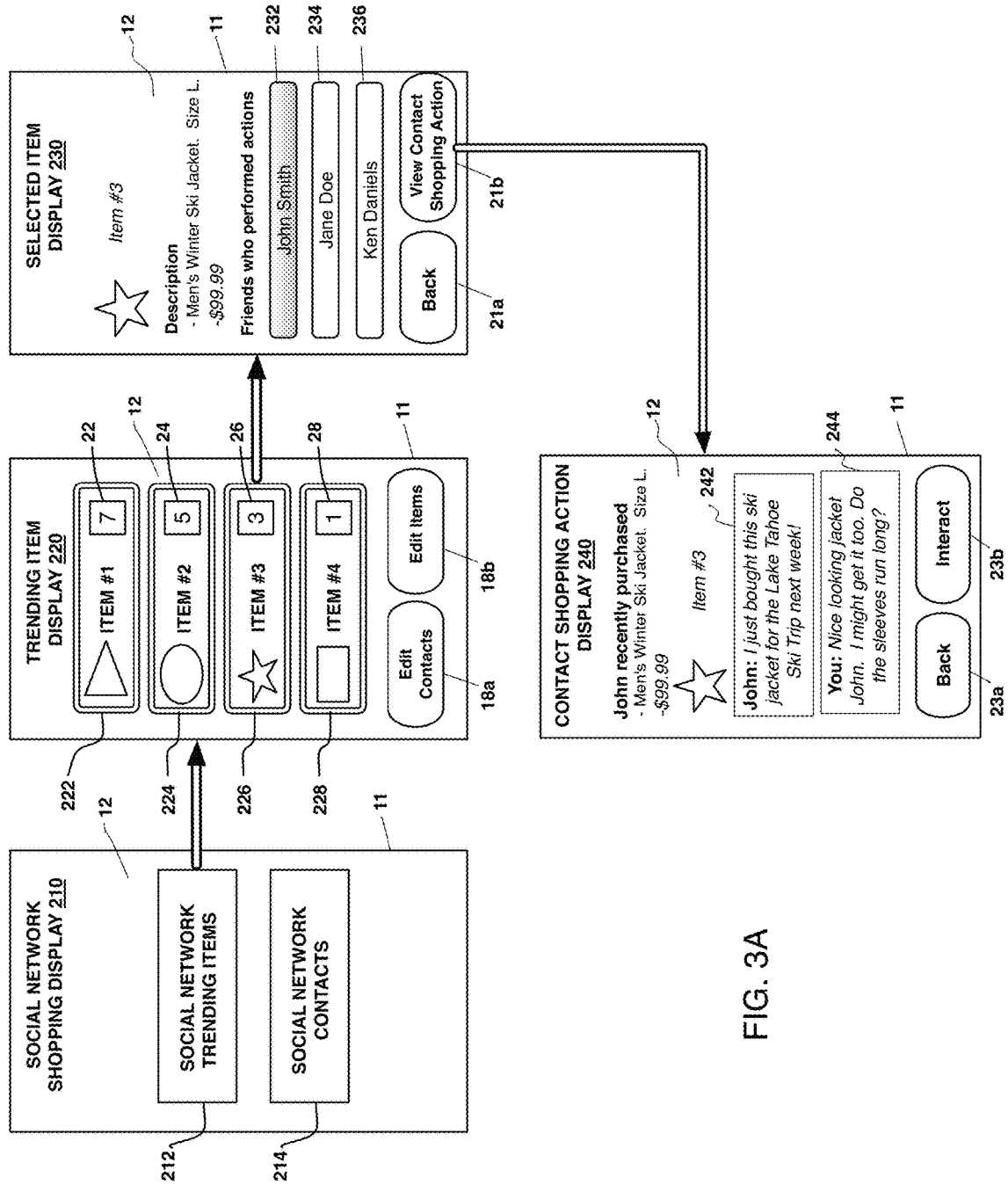
FIGS. 3A-3B schematically illustrate non-limiting examples of displayed shopping information for one or more contacts of a social network in the graphical user interface of FIG. 1, in accordance with the present disclosure.
Figure 3B:
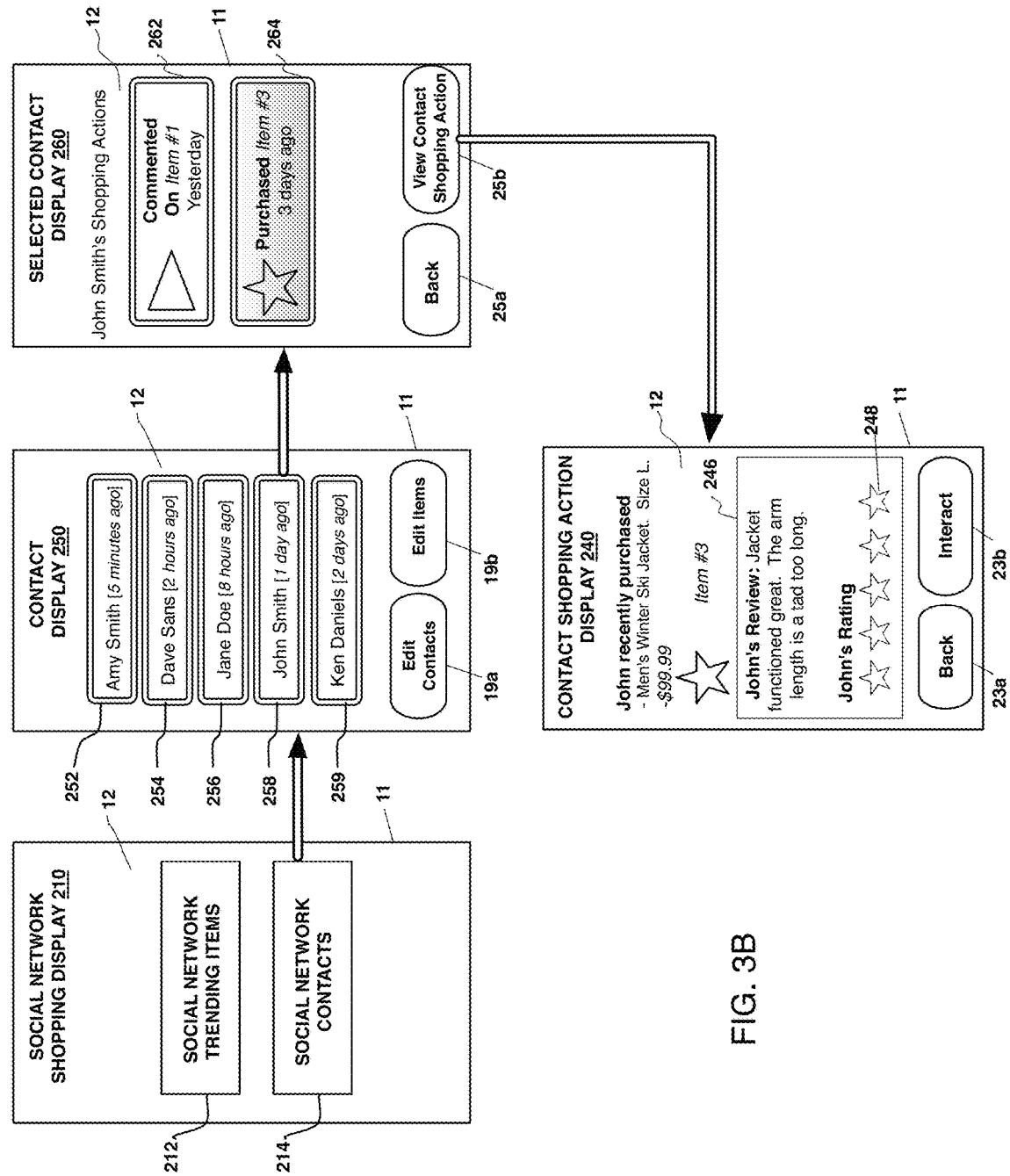

FIGS. 3A-3B schematically illustrate non-limiting examples of displayed shopping information for one or more contacts of a social network in the graphical user interface of FIG. 1, in accordance with the present disclosure. Each of FIGS. 3A-3B include the GUI 12 displayed upon the touch screen of the computing device 10 of FIG. 1. Screens for a social network shopping display 210, a trending item display 220, a selected item display 230 and a contact shopping action display 240 are illustrated in FIG. 3A. Screens for the social network display 210, a contact display 250, a selected contact display 260, and the contact shopping action display 240 are illustrated in FIG. 3B. In some embodiments, selection of a graphical element including icon 16 of FIG. 1, may advance the computing device 10 to the social network shopping display 210. The social network shopping display 210 serves as a gateway for viewing shopping information for one or more contacts of a social network.

Referring to FIG. 3A, upon selection of the "Social Network Trending Items" button 212, the GUI 12 may be advanced to the trending item display 220 to search and browse an obtained list of items indicative of shopping actions performed by one or more contacts of the social network. In one embodiment, the list may be interspersed within an electronic catalog including other items that may not be indicative of shopping actions. In response to a user input selecting the "Social Network Trending Items" button 212, a request to provide a list of items each indicative of the shopping action performed by the one or more contacts of the social network is transmitted to the processing device of the SA server 20 of FIG. 1. The processing device then retrieves each item having the shopping action performed by at least one of the contacts using one or more contact identifiers. It will be appreciated that each contact identifier corresponds to a contact of the social network of the user and is stored in a social network database of the SA server 20. The list of items is then generated based on each retrieved item. The processing device then generates shopping display data based on the list of items and transmits the shopping display data to the computing device.

The trending item display 220 can display operational inputs 18a and 18b, e.g., buttons, which are prompted by the computing device 10 for display in the GUI 12 when the generated shopping display data is received. Upon selection of the "Edit Contacts" button 18a, the user may request to only include preferred contacts having performed the shopping action relating to one or more of the list of items displayed in the GUI, wherein the request is provided to the SA server 20 as contact inclusion information. In one embodiment, selection of the "Edit Contacts" button 18a advances the GUI 12 to another display where the user is allowed to select preferred contacts. For instance, the user may select a group of "favorite" contacts that the user only interested in or the user may select one contact. Likewise, the user may select a "select all" button to include all contacts of the social network. Upon selection of the "Edit Items" button 18b, the user may request to only include specific items indicated by the user, wherein the request is provided the SA server 20 as item inclusion information. In one embodiment, selection of the "Edit Items" button 18b advances the GUI 12 to another display where the user is allowed to select specific items. For instance, the user may search for specific items by keyword or may search all items pertaining to a specific department of the retailer.

Still referring to the trending item display 220 of FIG. 3A, the list of items generated by the SA server 20 is displayed. As illustrated, graphical elements, e.g., buttons, 222, 224, 226 and 228 each correspond to respective items #1, #2, #3 and #4. When selected, the graphical elements 222, 224, 226 and 228 may be emphasized through highlighting, flashing or changing color. Additionally, contact indicators 22, 24, 26 and 28 each correspond to respective items #1, #2, #3 and #4. Each contact indicator provides a number of contacts whom have performed a shopping action related to the respective item. In the illustrated embodiment, a numeral represents the number of contacts. For instance, three (3) contacts have performed a user action related to item #3. Alternatively, each contact indicator may provide a date of the most recent shopping action performed by one of the contacts. Embodiments are directed toward the processing device of the SA server 20 sequentially ordering the list of items. In the illustrated embodiment, the list of items are sequentially ordered from an item having a greatest number of shopping actions, e.g., Item #1 (7), to an item having a least number of shopping actions performed, e.g., Item #4 (1). Alternatively, the list of items may be sequentially ordered from an item having a most recent shopping action performed to an item having a least recent shopping action performed. In the illustrated embodiment, the user has selected item #3 via touching or tapping button 226. Accordingly, the GUI 12 is advanced to the selected item display 230.

The selected item display 230 displays description information related to the selected item and a list of contacts contacts having performed a shopping action relating to the selected item. Thus, in response to a user input selecting button 226 in the trending item display 220, a request to provide a list of contacts each having performed the shopping action relating to an item selected is transmitted to the processing device of the SA server 20. The processing device then retrieves each contact having performed the shopping action related to the selected item from a shopping action database using an item identifier received from the computing device with the request. The list of contacts is then generated based on each retrieved contact. Thereafter, the processing device generates shopping display data based on the obtained list of contacts and transmits the shopping display data to the computing device 10, wherein the transmitted shopping data prompts the computing device to display the list of contacts in the selected item display 230. The generated shopping display data can include sequentially ordering the list of contacts. For instance, the list of contacts can be sequentially ordered from a contact having performed a most recent shopping action relating to the selected item to a contact having performed a least recent shopping action relating to the selected item.

In the illustrated embodiment, the selected item display 230 displays the selected item corresponding to item #3 and a list of three contracts. The description information can include a graphic of the selected item, a description of the selected item, e.g., "Men's Winter Ski Jacket, size L", and a cost to purchase the selected item from the retailer. As illustrated, graphical elements, e.g., buttons, 232, 234 and 236 each correspond to respective contacts, e.g., "John Smith", "Jane Doe", and "Ken Daniels". When selected, the graphical elements 232, 234 and 236 may be emphasized through highlighting, flashing or changing color. The selected item display 230 may further display operational inputs, e.g., buttons 21a and 21b, which are prompted when the transmitted shopping display data is received by the computing device 10. Upon selection of the "Back" button 21a, the GUI 12 is directed back to the trending item display 220. For instance, the user may not be interested in the selected item any longer and may wish to view shopping actions performed by contacts relating to another item displayed in the trending item display. Upon selection of the "View Contact Shopping Action" button 21b the GUI 12 is advanced to the contact shopping action display 240. In one embodiment, the user is not permitted to select the "View Contact Shopping Action" button 21b until the user has selected one of the contacts listed. In the illustrated embodiment, the user has selected "John Smith" by selecting button 232 and the GUI 12 is advanced to the contact shopping action display 240 when a user input is received by the "View Contact Shopping Action" button 21b.

The contact shopping action display 240 displays description information related to the selected item and shopping action information indicative of information relating to a shopping action performed by the contact selected in the selected item display. In the illustrated embodiment, shopping information relating to a purchase of item #3 performed by "John" is displayed. The description information can include a graphic of the selected item, a description of the selected item, and a cost to purchase the selected item from the retailer. The shopping action display 240 may further display comment information 242 indicative of a published comment explicitly shared by the contact relating to the shopping action performed. For instance, the contact may publish a comment indicating a rational and proposed use for an item recently purchased. The shopping action display 240 can further display a textual input element 244 that allows the user to insert text to publish a message directed to the selected contact. For instance, the user may congratulate the selected contact on their recent purchase and further inquire about the purchased item. In one embodiment, a keyboard may be prompted by the computing device for display upon the GUI 12 so that the user can insert the text. The contact shopping action display 240 may further display operational inputs, e.g., buttons 23a and 23b. Upon selection of the "Back" button 23a, the GUI 12 is directed back to the selected item display 230. For instance, after the user views the shopping action performed by the contact and any other pertinent information, the user may wish to view a shopping action performed by another contact listed in the selected item display 230. Upon selection of the "Interact" button 23b the computing device may send a message published by the user in the textual input element 244 to the contact. Thereafter, further interactions may be facilitated between the user and the contact, wherein the interactions may be associated with the selected item and stored.

Referring to FIG. 3B, upon selection of the "Social Network Contacts" button 214 in the social network shopping display 210, the GUI 12 may be advanced to the contact display 250 that displays a list of contacts of the social network having performed a shopping action related to one or more items offered for sale by the retailer. The list of contacts is generated by the processing device of the SA server 20 in response to selection of button 214. The contact display 250 may display operational inputs, e.g., buttons 19a and 19b. Upon selection of the "Edit Contacts" button 19a, the user can provide contact inclusion information to the processing device of the SA server 20 in the same manner as the "Edit Contacts" button 18a as described in the trending item display 220 provided in the non-limiting example of FIG. 3A. Upon selection of the "Edit Items" button 19b, the user can provide item inclusion information to the processing device in the same manner as the "Edit Contacts" button 18b as described in the trending item display 220 provided in the non-limiting example of FIG. 3A.

As illustrated in the contact display 250, graphical elements, e.g., buttons, 252, 254, 256, 258 and 259 each correspond to respective contacts indicated by name. Textual indicators may be displayed in relation to respective contacts. In the illustrated embodiment, the textual indicators indicate an elapsed time since each respective contact last performed a shopping action related to an item offered for sale by the retailer. In the illustrated embodiment, selection of button 258 corresponding to "John Smith" advances the GUI 12 to the selected contact display 260.

The selected contact display 260 displays a list of one or more items indicative of a shopping action performed by the contact selected from the contact display 250. For instance, the user may be particularly interested in viewing shopping actions performed by a preferred contact. Thus, in response to a user input to button 258, the user may request the processing device of the SA server 20 to provide a list of items each indicative of the shopping action performed by a selected contact, e.g., "John Smith". The processing device may generate the list of items and shopping display data based on the list of items in the same manner as in the trending item display 220 described with reference to the non-limiting example of FIG. 3A. Transmitting the shopping display data prompts the computing device to display the list of items in the selected contact display. Graphical elements, e.g., buttons 262 and 264, each correspond to respective items. In the illustrated embodiment, button 262 corresponds to "Item #1" and button 264 corresponds to "Item #3". Textual indicators displayed in relation to each of the items indicate at least one of the shopping action performed and a time elapsed since the shopping action relating to the respective item was performed by the selected contact. When selected, the buttons 262 and 264 may be emphasized through highlighting, flashing or changing color. In the illustrated embodiment, the user has selected button 264 corresponding to Item #3 purchased by John Smith three (3) days ago. The selected contact display further displays inputs 25a and 25b, which are prompted by the computing device in response to the transmitted shopping display data. Upon selection of the "Back" button 25a, the GUI 12 is directed back to the contact display. Upon selection of the "View Contact Shopping Action" button 25b the GUI 12 is advanced to the contact shopping action display 240. In one embodiment, the user is not permitted to select the "View Contact Shopping Action" button 25b until the user has selected one of the items listed.

As aforementioned, the contact shopping action display 240 displays description information related to the selected item and shopping action information indicative of information relating to a shopping action performed by the contact selected in the selected item display. In the illustrated embodiment, shopping information relating to a purchase of item #3 performed by "John" is displayed. In addition to description information and shopping action information indicative of a purchase of the selected item by the contact, e.g., item #3, the shopping action display 240 may further display shopping action information indicative of review information 246 related to a review published by the contact describing the purchased item. For instance, the user may view a review published by the contact describing how satisfied the contact is with the purchase and any abnormalities with the purchased item, e.g., arm length is a tad too long. One or more rating elements 248 may additionally be displayed in the contact shopping action display 240 that indicate a rating provided by the selected contact, e.g., "5 stars".

The contact shopping action display 240 may further display operational inputs, e.g., buttons 23a and 23b. Upon selection of the "Back" button 23a, the GUI 12 is directed back to the selected contact display 260. For instance, after the user views the shopping action performed by the contact and any other pertinent information, the user may wish to view a shopping action related to another item performed by the selected contact. A selection by the user to the "Interact" button 23b will initiate an interaction with the selected contact. In one embodiment, a keyboard may be prompted by the computing device for display upon the GUI 12 so that the user can insert text and thereafter send a message to the contact.

Figure 4:
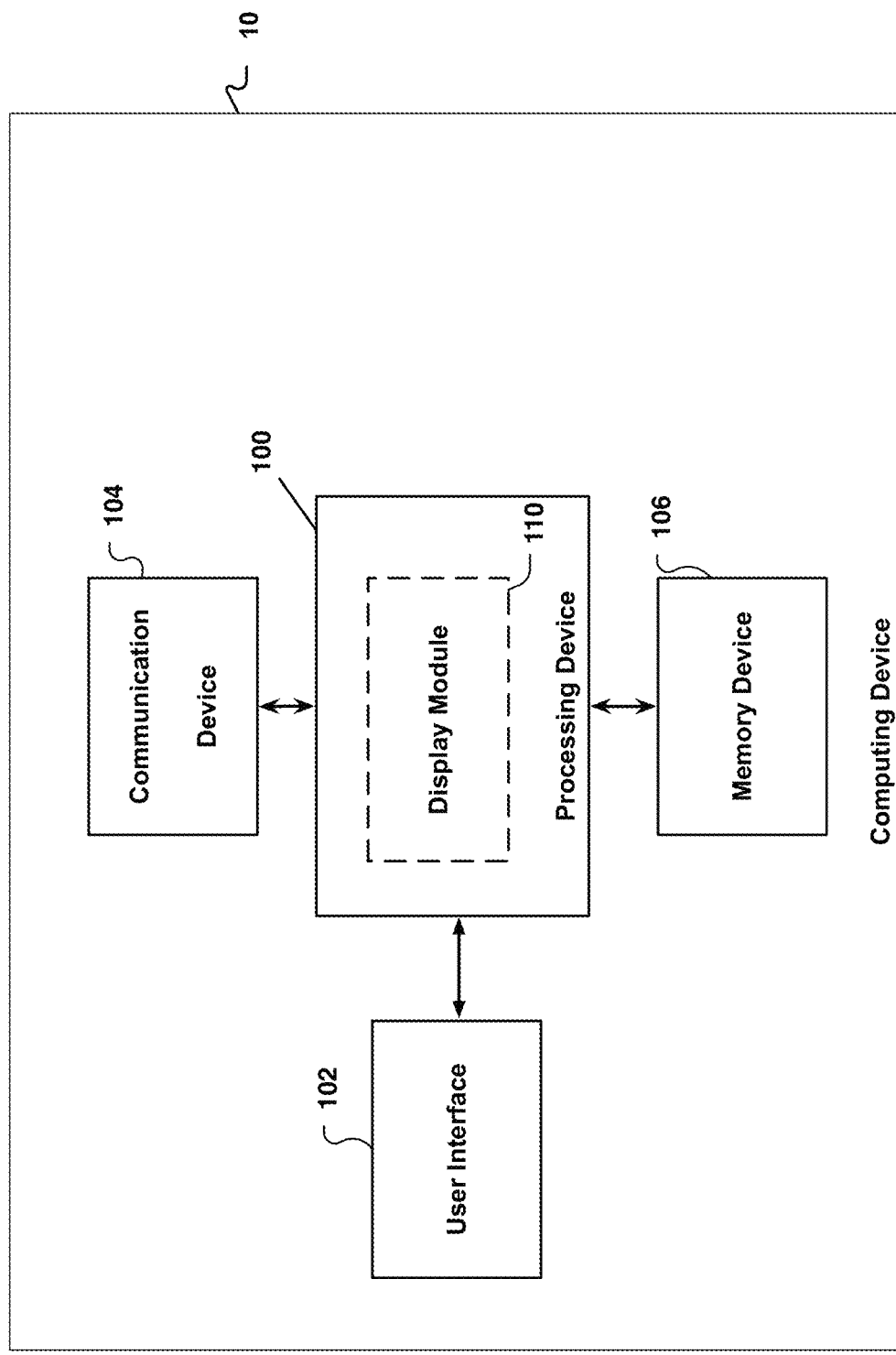
FIG. 4 is a block diagram illustrating components of the computing device of FIG. 1

Referring now to FIG. 4, a block diagram illustrating example components of the computing device 10 of FIG. 1 is depicted. In the example embodiment, the computing device 10 includes a processing device 100, a user interface 102, a communication device 104 and a memory device 106.

The processing device 100 can include memory, e.g., read only memory (ROM) and random access memory (RAM), storing processor-executable instructions and one or more processors that execute the processor-executable instructions. In embodiments where the processing device 100 includes two or more processors, the processors can operate in a parallel or distributed manner. The processing device 100 can execute the operating system of the computing device. In the illustrative embodiment, the processing device 100 also includes a display module 110 for displaying shopping information for one or more contacts of a social network transmitted as shopping display data from the SA server 20 of FIG. 1. The display module 110 may provide one or more graphical elements in the GUI 12 that allow the user to request the SA server 20 to provide the shopping action information for the one or more contacts. The display module 110 may additionally display other graphical elements in the GUI 12 allowing the user to select each graphical element through touching or tapping.

The user interface 102 is a device that allows a user to interact with the computing device 10. While one user interface 102 is shown, the term "user interface" can include, but is not limited to, a touch screen, a physical keyboard, a mouse, a microphone, and/or a speaker. The communication device 104 is a device that allows the mobile computing device 10 to communicate with another device, e.g., the SA server 20 and the social network server 40, via the network 30. The communication device 104 can include one or more wireless transceivers for performing wireless communication and/or one or more communication ports for performing wired communication. The memory device 106 is a device that stores data generated or received by the computing device 10. The memory device 106 can include, but is not limited to a hard disc drive, an optical disc drive, and/or a flash memory drive. The memory device 106 can include storage for contact inclusion information, item inclusion information and interactions with one or more contacts of the social network.

Figure 5:
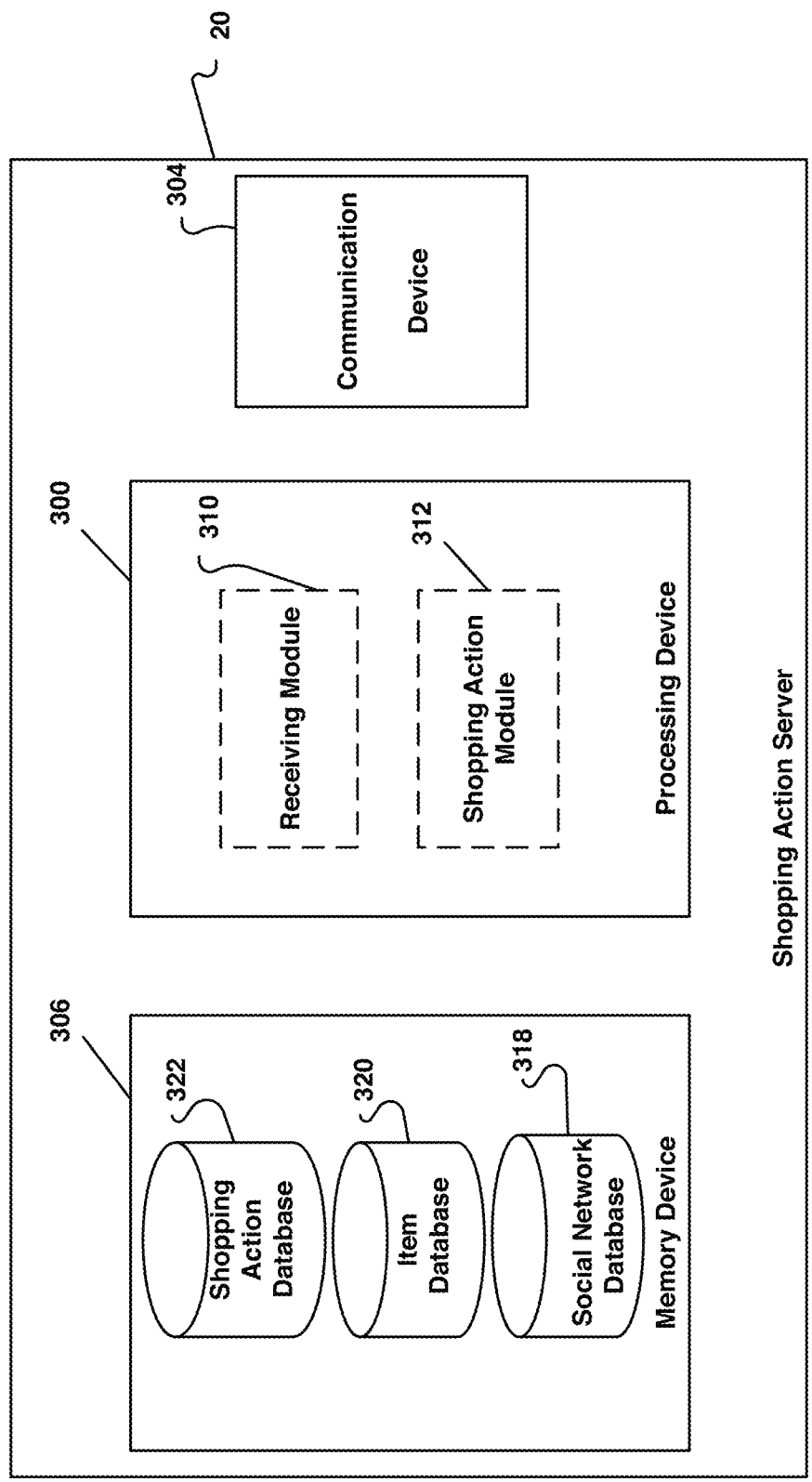
FIG. 5 is a block diagram illustrating components of the shopping action server of FIG. 1.

Referring now to FIG. 5, a block diagram illustrating an exemplary SA server 20 is depicted. In an exemplary embodiment, the SA server 20 includes a processing device 300, a communication device 304, and memory device 306.

The processing device 300 can include memory, e.g., read only memory (ROM) and random access memory (RAM), storing processor-executable instructions and one or more processors that execute the processor-executable instructions. In embodiments where the processing device 300 includes two or more processors, the processors can operate in a parallel or distributed manner. In the illustrative embodiment, the processing device 300 executes a receiving module 310 and a shopping action module 312, which are described in greater detail below.

The receiving module 310 receives a request from the computing device 10 to provide shopping information for one or more contacts of the social network. The request may be broadcasted via the network 30 of FIG. 1. For instance, the receiving module 310 may receive a request to provide a list of items, each item indicative of a shopping action performed by one or more users of the social network. Likewise, the receiving module 310 may receive a request to provide a list of contacts, each contact having performed a shopping action relating to an item selected by the computing device 10. The receiving module 310 may additionally receive contact inclusion information and item inclusion information updated by the user and transmitted from the computing device 10 as described with reference to the non-limiting examples of FIG. 3A-3B.

The shopping action module 312 obtains the shopping information for the one or more contacts based on the request received by the receiving module 310. The shopping action module 312 further generates shopping display data based on the shopping information and transmits the generated shopping display data to the computing device 10. In one embodiment, the generated shopping display data includes sequentially ordering a list of items each indicative of the shopping action performed by the one or more contacts of the social network as described with reference to the trending item display 220 provided in the non-limiting example of FIG. 3A. In another embodiment, the generated shopping display data includes sequentially ordering a list of contacts each having performed the shopping action related to a selected item as described with reference to the selected item display 230 provided in the non-limiting example of FIG. 3A. The transmitted shopping display data prompts the computing device 10 to display the shopping information. The shopping action module 312 can further display an operational input in the GUI 12 in response to the computing device 10 selecting one of the contacts having performed the shopping action relating to one of the items selected by the computing device based on the transmitted shopping display data. For instance, a user input received by the operational input can allow the user interact with the one contacting having performed the shopping action related to the selected item as described with reference to the "Interact" button 23b of the contact shopping action display 240 provided in the non-limiting examples of FIGS. 3A-3B.

The communication device 304 is a device that allows the SA server 20 to communicate with another device, e.g., the mobile computing device 10 and the social network server 40, via the network 30. The communication device 304 can include one or more wireless transceivers for performing wireless communication and/or one or more communication ports for performing wired communication.

The memory device 306 is a device that stores data generated or received by the purchasing server 20. The memory device 306 can include, but is not limited to, a hard disc drive, an optical disc drive, and/or flash memory drive. Further, the memory device 306 may be distributed and located at multiple locations. The memory device 306 is accessible to the processing device 300.

A social network database 318, or similar structure, can be stored in the memory device 306. The social network database 318 stores a plurality of contact identifiers for a plurality of contacts of the social network. In an exemplary embodiment, the social network server 40 of FIG. 1 may provide contact identifiers for storage in the social network database 318, wherein each contact identifier corresponds to respective ones of contacts of the social network. For instance, the social network server 40 may update the contact identifiers stored in the social network database 318 when the user adds new contacts or removes existing contacts.

Additionally, an item database 320, or similar structure, can be stored in the memory device 306. In an exemplary embodiment, the retailer maintains the item database 320 to store a plurality of items offered for sale by the retailer indicative of the shopping action performed by a plurality of contacts of the social network. When the computing device 10 requests the processing device 300 to provide a list of items indicative of the shopping action performed by one or more contacts, the shopping action module 312 may query the social network database 318 to obtain one or more contact identifiers and then retrieve each item having the shopping action performed by at least one of the contacts from the item database 320 using the one or more contact identifiers. The list of items requested by the user is then generated by the shopping action module 312 based on each item retrieved from the item database 320.

Furthermore, a shopping action database 322, or similar structure, can be stored in the memory device 306. In an exemplary embodiment, the social network server 40 of FIG. 1 provides a plurality of contacts each having performed the shopping action related to a plurality of items offered for sale by the retailer for storage in the shopping action database. For instance, a contact may explicitly share with the social network a published review relating to an item purchased from the retailer, wherein the social network server 40 subsequently provides a contact identifier corresponding to the contact, an item identifier corresponding to the purchased item, and shopping action information corresponding to the published review for storage in the shopping action database 322. In response to a request to provide a list of contacts each having performed the shopping action relating to an item selected by the computing device 10, the shopping action module 312 can receive an item identifier, e.g., UPC, corresponding to the selected item broadcasted from the computing device 10 via the network 30. Using the item identifier, the shopping action module 312 may then retrieve each contact having performed the shopping action related to the selected item stored in the shopping action database 322 for generating the list of contacts and the shopping display data to be transmitted to the computing device 10.

The flowchart and block diagrams in the flow diagrams illustrate the architecture, functionality, and operation of possible implementations of methods and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Figure 6:
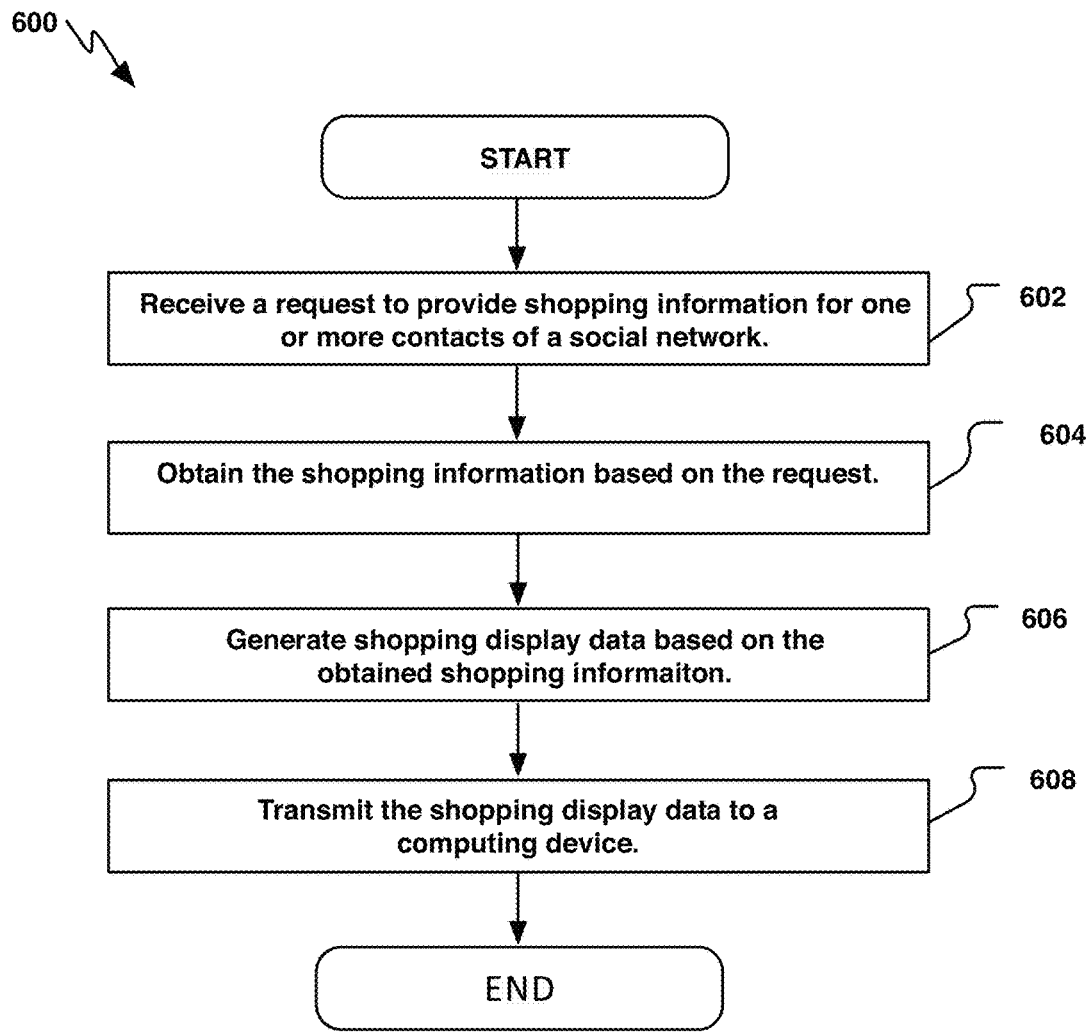
FIG. 6 is a flowchart illustrating an example method for providing shopping information for one or more contacts of a social network of a user for display in a graphical user interface of a computing device corresponding to the user, in accordance with the present disclosure.

FIG. 6 illustrates an example method of a flowchart 600 that can be executed by the SA server 20 for providing a computing device corresponding to a user shopping information for a plurality of contacts of a social network of the user. At operation 602, the receiving module 310 receives a request to provide shopping information for one or more contacts of the social network. The shopping information can relate to one or more items offered for sale by a retailer indicative of a shopping action performed and explicitly shared by the one or more contacts. For instance, the receiving module 310 can receive a request to provide a list of items each indicative of the shopping action performed by one or more contacts of the social network. Similarly, the receiving module 310 can receive a request to provide a list of contacts each having performed the shopping action related to an item selected by the computing device 10 of FIG. 1. The receiving module 310 may further receive item inclusion information from the computing device 10 that includes a preference of the user for only providing shopping information relating to items that are explicitly preferred by the user. For instance, a user may only wish to view shopping actions performed by contacts that relate to sporting goods. Furthermore, the receiving module 310 may receive contact inclusion information from the computing device 10 that includes a preference of the user for only providing shopping information for contacts that are explicitly preferred by the user.

At operation 604, the shopping action module 312 obtains the shopping information based on the request received at the receiving module 310. As aforementioned, the shopping action module 312 can obtain the shopping information by receiving one or more contact identifiers from the social network server 40 and retrieving each item having the shopping action performed by at least one of the contacts using the one or more contact identifiers. Likewise, the shopping action module 312 can obtain the shopping information by receiving an item identifier corresponding to an item selected by the user and retrieving one or more contacts having performed the shopping action related to the selected item using the item identifier.

At operation 606, the shopping action module 312 generates shopping display data based on the obtained shopping information. In one embodiment, the shopping display data can include sequentially ordering a list of items each indicative of the shopping action performed by the one or more contacts as described with reference to the trending item display 220 provided in the non-limiting example of FIG. 3A. In another embodiment, the generated shopping display data includes sequentially ordering a list of contacts each having performed the shopping action related to a selected item as described with reference to the selected item display 230 provided in the non-limiting example of FIG. 3A.

At operation 608, the shopping action module 312 transmits the shopping display data to the computing device 10. The transmitted shopping display data prompts the computing device 10 to display the shopping information in the GUI 12. For instance, a list of items may be displayed in the trending item display 220 or a list of contacts may be displayed in the selected item display 230 prompted by the transmitted shopping display data as provided in the non-limiting examples of FIGS. 3A-3B. The shopping action module 312 can further display an operational input in the GUI 12 in response to the computing device 10 selecting one of the contacts having performed the shopping action relating to one of the items selected by the computing device based on the transmitted shopping display data.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A computer-implemented method comprising:
   updating a shopping action database when a contact of a plurality of contacts of a social network of a user performs and shares a shopping action;
   receiving from a computing device associated with the user, at a processing device of a shopping action server located remotely from the computing device, a shopping information request to provide shopping information for the plurality of contacts, the shopping information relating to multiple items offered for sale by a retailer and associated with the shopping action;
   obtaining, at the processing device, the shopping information based at least in part on the shopping information request;
   generating, at the processing device, shopping display data based at least in part on the shopping information;
   facilitating displaying, in a graphical user interface of the computing device associated with the user, a social network trending items operational input and a social network contacts operational input; and
   when the user selects the social network trending items operational input:
   (1) facilitating displaying, in the graphical user interface of the computing device associated with the user and using the shopping display data;
      (i) a graphical element for each item of a portion of the multiple items offered for sale by the retailer and associated with the shopping action of the contact, wherein the portion of the multiple items comprises items most often having the shopping action performed on them by the plurality of contacts and graphical elements for each item of the portion of the multiple items are sequentially ordered from most often having the shopping action performed on them by the plurality of contacts to least often having the shopping action performed on them by the plurality of contacts;
      (ii) an edit contacts operational input; and
      (ii) an edit items operational input;
   (2) when user selects a graphical element for an item of the portion of the multiple items, facilitating displaying, in the graphical user interface of the computing device associated with the user, a list of graphical elements for contacts of the plurality of contacts that have performed the shopping action on the item of the portion of the multiple items;
      (i) when the user selects a graphical element for a specific contact of the plurality of contacts that have performed the shopping action on the item, facilitating displaying, in the graphical user interface of the computing device associated with the user, a comment operational input and an add to cart operational input;
      (ii) when the user selects the comment operational input, facilitating displaying, in the graphical user interface of the computing device associated with the user, an item comment display, the item comment display comprising (1) an item description for the item, (2) a first textual input element configured to receive a first user comment entered by the user, and (3) a share comment operational input, wherein when the user selects the share comment operational input, the first user comment inputted in the first textual input element is shared with the plurality of contacts of the social network of the user; and
      (iii) when the user selects the add to cart operational input, facilitating displaying, in the graphical user interface of the computing device associated with the user, a shopping cart display, the shopping cart display comprising (1) the item description for the item, (2) a second textual input element configured to receive a second user comment entered by the user, (3) a share purchase operational input, wherein when the user selects the share purchase operational input, the second user comment inputted in the second textual input element is shared with the plurality of contacts of the social network of the user, and (4) a confirm purchase operational input;
   (3) when the user selects the edit contacts operational input, allowing the user to filter shopping actions performed by contacts of the plurality of contacts from shopping actions performed on the portion of the multiple items; and
   (4) when the user selects the edit items operational input, allowing the user to filter items of the portion of the multiple items.

2. The computer-implemented method of claim 1, further comprising:
- receiving, at the processing device, item inclusion information from the computing device, the item inclusion information comprising a preference of the user for receiving, at the processing device, the shopping information for the plurality of contacts that relates only to user preferred items offered for sale by the retailer; and
- receiving, at the processing device, contact inclusion information from the computing device, the contact inclusion information comprising a preference of the user for receiving, at the processing device, the shopping information for the plurality of contacts that relates only to one or more user preferred contacts of the plurality of contacts of the social network of the user.

3. The computer-implemented method of claim 1, wherein:
- the shopping information request comprises a request to provide an item list of at least the portion of the multiple items to the computing device.

4. The computer-implemented method of claim 3, wherein:
- obtaining the shopping information based at least in part on the shopping information request comprises:
  - receiving, at the processing device, a contact identifier from a social network database of the social network in response to the shopping information request, the contact identifier corresponding to the contact, wherein the social network database stores the contact identifier; and
  - retrieving from an item database using the contact identifier, at the processing device, the multiple items, the item database storing the multiple items.

5. The computer-implemented method of claim 1, wherein:
- the shopping information request comprises:
  - a contact request to provide multiple contacts in a contact list to the computing device, each contact of the multiple contacts being associated with the shopping action, and at least one item of the multiple items being selected by the computing device; and
- obtaining the shopping information based at least in part on the shopping information request comprises:
  - receiving, at the processing device, an item identifier corresponding to the at least one item of the multiple items; and
  - retrieving from the shopping action database using the item identifier, at the processing device, the multiple contacts, the shopping action database storing the multiple contacts.

6. The computer-implemented method of claim 1, wherein:
- the shopping action comprises at least one of:
  - a purchase;
  - a published comment;
  - a published review; or
  - a contact rating relating to at least one item of the multiple items.

7. The computer-implemented method of claim 1, wherein:
- the shopping action comprises a review of at least one item of the multiple items, the review published by the contact after a predetermined period of time has elapsed after the contact has purchased the at least one item of the multiple items.

8. The computer-implemented method of claim 1, wherein the shopping action comprises:
- a purchase;
- a published comment;
- a published review; and
- a contact rating relating to at least one item of the multiple items.

9. The computer-implemented method of claim 1, further comprising:
- when the user selects the confirm purchase operational input, facilitating displaying, in the graphical user interface of the computing device associated with the user, a review purchased item display comprising (1) the item description for the item, (2) a third textual input element configured to receive a third user comment entered by the user, and (3) a share review operational input, wherein when the user selects the share review operational input, the third user comment inputted in the third textual input element is shared with the plurality of contacts of the social network of the user.

10. The computer-implemented method of claim 1, wherein:
- the computer-implement method further comprises:
  - receiving, at the processing device, item inclusion information from the computing device, the item inclusion information comprising a preference of the user for receiving, at the processing device, shopping information for the plurality of contacts that relates only to user preferred items offered for sale by the retailer;
  - receiving, at the processing device, contact inclusion information from the computing device, the contact inclusion information comprising a preference of the user for receiving, at the processing device, the shopping information for the plurality of contacts that relates only to one or more user preferred contacts of the plurality of contacts of the social network of the user; and
  - when the user selects the confirm purchase operational input, facilitating displaying, in the graphical user interface of the computing device associated with the user, a review purchased item display comprising (1) the item description for the item, (2) a third textual input element configured to receive a third user comment entered by the user, and (3) a share review operational input, wherein when the user selects the share review operational input, the third user comment inputted in the third textual input element is shared with the plurality of contacts of the social network of the user;
- the shopping information request comprises a request to provide an item list of at least the portion of the multiple items to the computing device;
- obtaining the shopping information based at least in part on the shopping information request comprises:
  - receiving, at the processing device, a contact identifier from a social network database of the social network in response to the shopping information request, the contact identifier corresponding to the contact, wherein the social network database stores the contact identifier; and
  - retrieving from an item database using the contact identifier, at the processing device, the multiple items, the item database storing the multiple items;
- the shopping information request comprises:

a contact request to provide multiple contacts in a contact list to the computing device, each contact of the multiple contacts being associated with the shopping action, and at least one item of the multiple items being selected by the computing device;

obtaining the shopping information based at least in part on the shopping information request comprises:

receiving, at the processing device, an item identifier corresponding to the at least one item of the multiple items; and retrieving from the shopping action database using the item identifier, at the processing device, the multiple contacts, the shopping action database storing the multiple contacts;

the shopping action comprises at least one of:
a purchase;
a published comment;
a published review; or
a contact rating relating to the at least one item of the multiple items; and the shopping action comprises a review of the at least one item of the multiple items, the review published by the contact after a predetermined period of time has elapsed after the contact has purchased the at least one item of the multiple items.

11. The computer-implemented method of claim 1, further comprising, when the user selects the social network contacts operational input:

(1) facilitating displaying, in the graphical user interface of the computing device associated with the user and using the shopping display data:
 (i) a graphical element for a portion of the plurality of contacts;
 (ii) an edit contacts operational input; and
 (iii) an edit items operational input;

(2) when the user selects a graphical element for a contact of the portion of the plurality of contacts, facilitating displaying, in the graphical user interface of the computing device associated with the user, a selectable graphical element for a plurality of different shopping actions performed by the contact of the portion of the plurality of contacts and a view contact shopping action operational input;

(3) when the user selects a selectable graphical element for a shopping action of the plurality of different shopping actions performed by the contact of the portion of the plurality of contacts and then selects the view contact shopping action operational input, facilitating displaying the shopping action of the plurality of different shopping actions;

(4) when the user selects the edit contacts operational input, allowing the user to filter the portion of the plurality of contacts; and (5) when the user selects the edit items operational input, allowing the user to filter items of the portion of the multiple items.

12. A shopping action server comprising:

a shopping action database configured to be updated when a contact of a plurality of contacts of a social network of a user performs and shares a shopping action;

a receiver configured to receive, from a computing device associated with the user and located remotely from the shopping action server, a shopping information request to provide shopping information for the contact, the shopping information relating to multiple items offered for sale by a retailer and associated with the shopping action; and a processor, wherein in response to the shopping information request received at the receiver, the processor:

obtains the shopping information based at least in part on the shopping information request;

generates shopping display data based at least in part on the shopping information;

facilitates displaying, in a graphical user interface of the computing device associated with the user, a social network trending items operational input and a social network contacts operational input; and when the user selects the social network trending items operational input:

(1) facilitates displaying, in the graphical user interface of the computing device associated with the user and using the shopping display data:
 (i) a graphical element for each item of a portion of the multiple items offered for sale by the retailer and associated with the shopping action of the contact, wherein the portion of the multiple items comprises items most often having the shopping action performed on them by the plurality of contacts and graphical elements for each item of the portion of the multiple items are sequentially ordered from most often having the shopping action performed on them by the plurality of contacts to least often having the shopping action performed on them by the plurality of contacts;
 (ii) an edit contacts operational input; and
 (ii) an edit items operational input;

(2) when the user selects a graphical element for an item of the portion of the multiple items, facilitates displaying, in the graphical user interface of the computing device associated with the user, a list of graphical elements for contacts of the plurality of contacts that have performed the shopping action on the item of the portion of the multiple items;
 (i) when the user selects a graphical element for a specific contact of the plurality of contacts that have performed the shopping action on the item, facilitates displaying, in the graphical user interface of the computing device associated with the user, a comment operational input and an add to cart operational input;
 (ii) when the user selects the comment operational input, facilitates displaying, in the graphical user interface of the computing device associated with the user, an item comment display, the item comment display comprising (1) an item description for the item, (2) a first textual input element configured to receive a first user comment entered by the user, and (3) a share comment operational input, wherein when the user selects the share comment operational input, the first user comment inputted in the first textual input element is shared with the plurality of contacts of the social network; and
 (iii) when the user selects the add to cart operational input, facilitates displaying, in the graphical user interface of the computing device associated with the user, a shopping cart display, the shopping cart display comprising (1) the item description for the item, (2) a second textual input element configured to receive a second user comment entered by the user, (3) a share purchase operational input, wherein when the user selects the share purchase operational input, the second user comment inputted in the second textual input element is shared with the plurality of contacts of the social network, and (4) a confirm purchase operational input;

(3) when the user selects the edit contacts operational input, allows the user to filter shopping actions performed by contacts of the plurality of contacts from shopping actions performed on the portion of the multiple items; and (4) when the user selects the edit items operational input, allows the user to filter items of the portion of the multiple items.

13. The shopping action server of claim 12, wherein the receiver further:

receives item inclusion information from the computing device, the item inclusion information comprising a preference of the user for receiving the shopping information for the plurality of contacts that relates only to user preferred items offered for sale by the retailer; and receives contact inclusion information from the computing device, the contact inclusion information comprising a preference of the user for receiving the shopping information for the plurality of contacts that relates only to one or more user preferred contacts of the plurality of contacts of the social network of the user.

14. The shopping action server of claim 12, wherein:

the shopping information request comprises a request to provide an item list of at least the portion of the multiple items to the computing device.

15. The shopping action server of claim 14, wherein the processor obtains the shopping information by:

receiving a contact identifier from a social network database of the social network in response to the shopping information request, the contact identifier corresponding to the contact, wherein the social network database stores the contact identifier; and retrieving from an item database using the contact identifier the multiple items, the item database storing the multiple items.

16. The shopping action server of claim 12, wherein:

the shopping information request comprises:

a contact request to provide multiple contacts in a contact list to the computing device, each contact of the multiple contacts being associated with the shopping action, and at least one item of the multiple items being selected by the computing device; and the processor obtains the shopping information by:

receiving an item identifier corresponding to the at least one item of the multiple items; and retrieving from the shopping action database using the item identifier the multiple contacts.

17. The shopping action server of claim 12, wherein the shopping action comprises at least one of:

a purchase;

a published comment;

a published review; or a contact rating relating to at least one item of the multiple items.

18. The shopping action server of claim 12, wherein:

the shopping action comprises a review of at least one item of the multiple items, the review published by the contact after a predetermined period of time has elapsed after the contact has purchased the at least one item of the multiple items.

19. The shopping action server of claim 12, wherein the shopping action comprises:

a purchase;

a published comment;

a published review; and a contact rating relating to at least one item of the multiple items.

20. The shopping action server of claim 12, wherein, when the user selects the confirm purchase operational input, the processor further:

facilitates displaying, in the graphical user interface of the computing device associated with the user, a review purchased item display comprising (1) the item description for the item, (2) a third textual input element configured to receive a third user comment entered by the user, and (3) a share review operational input, wherein when the user selects the share review operational input, the third user comment inputted in the third textual input element is shared with the plurality of contacts of the social network of the user.

21. The shopping action server of claim 12, wherein:

the receiver further:

receives item inclusion information from the computing device, the item inclusion information comprising a preference of the user for receiving the shopping information for the plurality of contacts that relates only to user preferred items offered for sale by the retailer; and receives contact inclusion information from the computing device, the contact inclusion information comprising a preference of the user for receiving the shopping information for the plurality of contacts that relates only to one or more user preferred contacts of the plurality of contacts of the social network of the user;

when the user selects the confirm purchase operational input, the processor further facilitates:

displaying, in the graphical user interface of the computing device associated with the user, a review purchased item display comprising (1) the item description for the item, (2) a third textual input element configured to receive a third user comment entered by the user, and (3) a share review operational input, wherein when the user selects the share review operational input, the third user comment inputted in the third textual input element is shared with the plurality of contacts of the social network of the user;

the shopping information request comprises a request to provide an item list of at least the portion of the multiple items to the computing device;

the processor obtains the shopping information by:

receiving a contact identifier from a social network database of the social network in response to the shopping information request, the contact identifier corresponding to the contact, wherein the social network database stores the contact identifier; and retrieving from an item database using the contact identifier the multiple items, the item database storing the multiple items;

the shopping information request comprises:

a contact request to provide multiple contacts in a contact list to the computing device, each contact of the multiple contacts being associated with the shopping action, and at least one item of the multiple items being selected by the computing device;

the processor obtains the shopping information by:

receiving an item identifier corresponding to the at least one item of the multiple items; and retrieving from the shopping action database using the item identifier the multiple contacts;

the shopping action comprises at least one of:
 a purchase;
 a published comment;
 a published review; or
 a contact rating relating to the at least one item of the multiple items; and the shopping action comprises a review of the at least one item of the multiple items, the review published by the contact after a predetermined period of time has elapsed after the contact has purchased the at least one item of the multiple items.

22. The shopping action server of claim 12, when the user selects the social network contacts operational input, the processor further responds to the shopping information request by:
 (1) facilitates displaying, in the graphical user interface of the computing device associated with the user and using the shopping display data:
  (i) a graphical element for a portion of the plurality of contacts;
  (ii) an edit contacts operational input; and
  (iii) an edit items operational input;
 (2) when the user selects a graphical element for a contact of the portion of the plurality of contacts, facilitates displaying, in the graphical user interface of the computing device associated with the user, a selectable graphical element for a plurality of different shopping actions performed by the contact of the portion of the plurality of contacts and a view contact shopping action operational input;
 (3) when the user selects a selectable graphical element for a shopping action of the plurality of different shopping actions performed by the contact of the portion of the plurality of contacts and then selects the view contact shopping action operational input, facilitates displaying the shopping action of the plurality of different shopping actions;
 (4) when the user selects the edit contacts operational input, allows the user to filter the portion of the plurality of contacts; and
 (5) when the user selects the edit items operational input, allows the user to filter items of the portion of the multiple items.

* * * * *